J. A. RHONE.
VEHICLE WHEEL.
APPLICATION FILED OCT. 19, 1914.
1,152,220.
Patented Aug. 31, 1915.
2 SHEETS—SHEET 1.
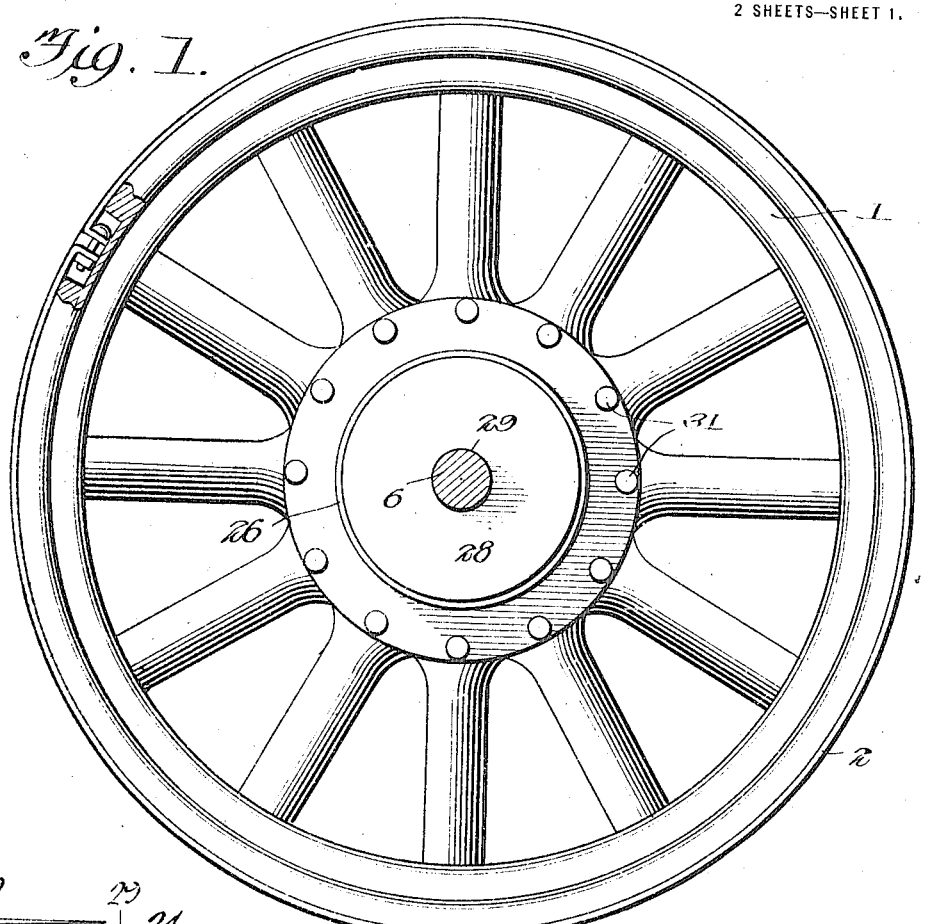
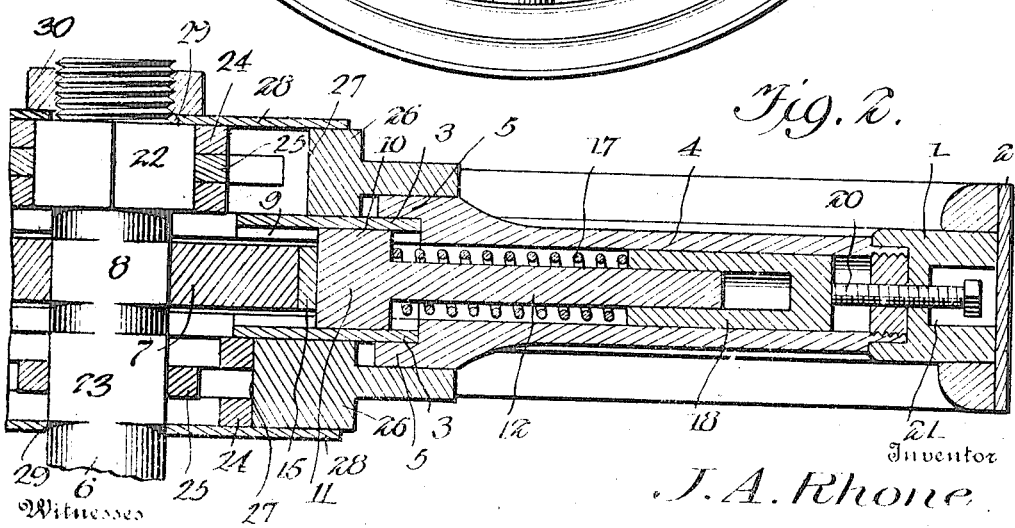

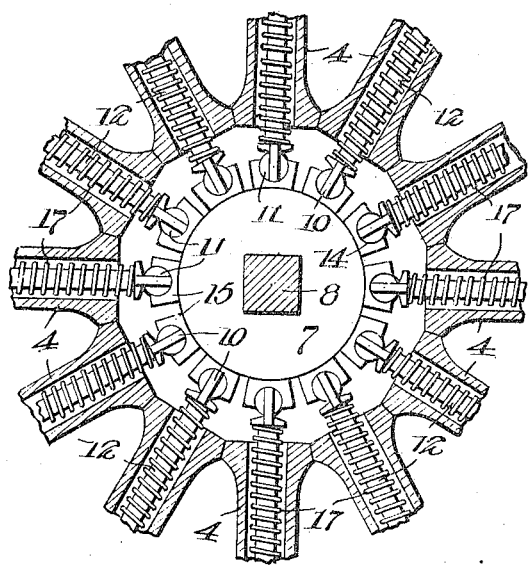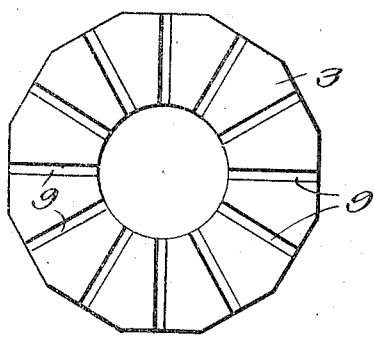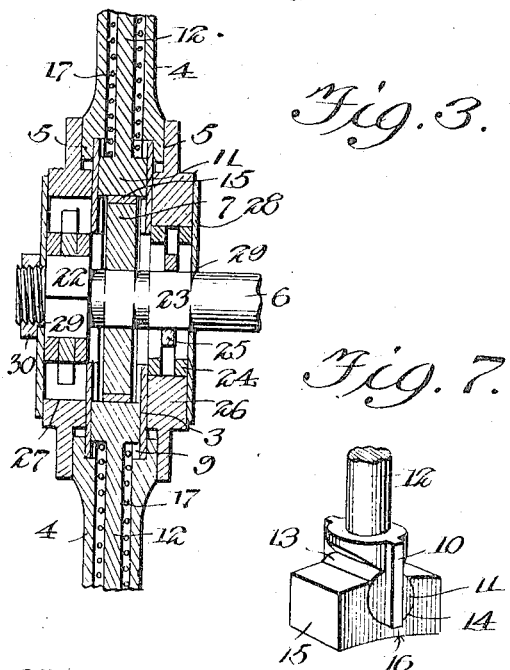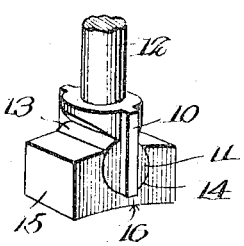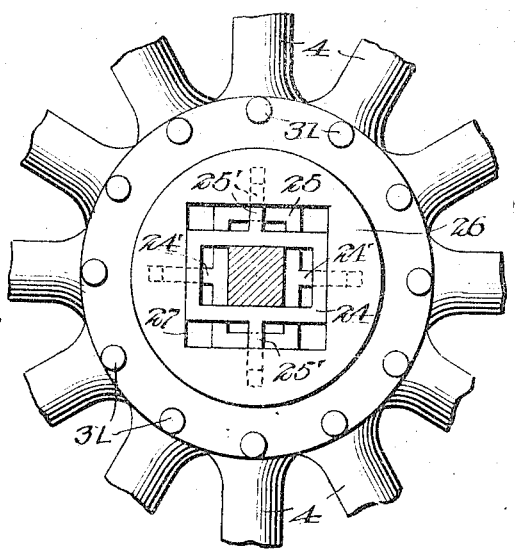

UNITED STATES PATENT OFFICE.

JOHN A. RHONE, OF SARATOGA, WYOMING.

VEHICLE-WHEEL.

1,152,220.     Specification of Letters Patent.     Patented Aug. 31, 1915.

Application filed October 19, 1914. Serial No. 867,491.

*To all whom it may concern:*

Be it known that I, JOHN A. RHONE, a citizen of the United States, residing at Saratoga, in the county of Carbon and State of Wyoming, have invented new and useful Improvements in Vehicle-Wheels, of which the following is a specification.

This invention relates to vehicle wheels, the broad object of the invention being to produce a strong, reliable and efficient resilient wheel embodying a novel construction and arrangement of hub cushioning means whereby the hub which has a floating relation to the main body of the wheel is cushioned in all directions relatively to and within the vertical plane of the wheel as a whole.

By means of the invention hereinafter described, the pneumatic tire now in common use and any troubles incident to the use thereof are done away with, the road shocks and vibrations being absorbed by and within the wheel itself irrespective of the tire.

With the above and other objects in view, the invention consists in the novel construction, combination and arrangement of parts, as will be hereinafter more fully described, illustrated and claimed.

In the accompanying drawings:—Figure 1 is a side elevation of a wheel embodying the present invention. Fig. 2 is a radial cross section through the same. Fig. 3 is an enlarged diametrical section through the center of the wheel structure. Fig. 4 is a side elevation of the central part of the wheel omitting the adjacent guard plate. Fig. 5 is an inside face view of the grooved housing plate. Fig. 6 is a view similar to Fig. 4 omitting the adjacent plates and keys and showing the core and shoes. Fig. 7 is a detail perspective view of one of the plungers, the plunger head and rocker shoe.

Referring to the drawings 1 designates the felly and 2 the tire of a vehicle wheel, both of which may be of any usual or preferred construction.

In carrying out the present invention I employ a pair of housing plates 3 to which are connected the inner ends of a circular series of tubular spokes 4 each of which bears a fixed relation to the felly 1 and the housing plates 3, the said spokes serving also as means for rigidly connecting the housing plates 3 which latter are arranged in spaced relation to each other to form an intervening space or chamber in which the floating hub is movable in all directions in the vertical plane of the wheel. Each spoke is bifurcated at its inner end or provided with laterally spaced ears 5 which are fastened to the housing plates 3 as shown.

6 designates the wheel hub which carries a cylindrical core 7 preferably formed with a non-circular central opening to fit upon an enlargement 8 of corresponding shape centrally of the hub 6 so that said core is prevented from rotating on the hub. The core 7 is mounted to move in all directions in the vertical plane of the wheel and between the housing plates 3 and both of said housing plates are provided in their inner faces with radially extending grooves 9 to receive tongues or ribs 10 on the plunger heads 11 at the inner ends of a circular series of plungers 12, one of said plungers being used in connection with each spoke 4 within which it is slidable longitudinally. Each plunger head 11 embodies a cylindrical bearing portion 13 which is received in a recess 14 of corresponding shape in a rocking connection between each shoe and plunger head so as to enable the inner concaved face 16 of the shoe 15 to bear throughout its entire area and under all positions of said shoe against the outer periphery of the core 7. The tongue and groove connection between each plunger head and the housing plate 3 insures the proper radial guiding of the plunger rod.

Disposed around each of the plunger rods 12 is a spiral cushioning spring 17 the tension of which is adjustable by means of a tension screw 20 and a ferrule 18 which fits over the outer extremity of the respective plunger rod 12, the screw 20 acting against the ferrule 18 and the latter serving to compress or relieve the spring 17. The head of the tension screw 20 is arranged in a recess 21 in the felly 2. The screws 20 are adjusted primarily before applying the tire and its rim to the wheel, the adjustment of the springs being in accordance with the load to be imposed on the wheel.

The means for producing a driving connection between the hub and the main body of the wheel will now be described. The hub is provided at opposite sides of the enlargement 8 with other non-circular enlargements 22 and 23 each of which is shown as square in cross section with the flat faces of one enlargement extending obliquely with respect to the corresponding faces of the other enlargement. Slidably mounted on the enlargements 22 and 23 are universal movement keys 24 and 25, a plurality of such keys being used in connection with each of the non-circular enlargements 22 and 23. In connection with each set of keys 24 and 25, I employ a driving plate 26 which is formed with a central non-circular opening 27 shown as square in shape and of such dimensions as to receive both of the keys 24 and 25 and permit the same to slide in a direction at right angles to each other. Each key is shown in the form of an open center rectangle the internal transverse dimension of which is slightly greater than the outside dimensions of the respective enlargement 22 or 23 so that each key may slide in the direction of its length on such enlargement while sliding in the direction of its width within the opening 27 of the adjacent driving plate. By arranging two sets of keys and driving the plates at opposite sides of the wheel and arranging the flat faces of one of the enlargements at an angle or obliquely with respect to the flat faces of the other enlargement, an easy working universal keyed connection is established between the floating hub and the main body of the wheel which adapts said hub to yield in all directions in the vertical plane of the wheel under the action of the cushioning means. The keys 24 and 25 are provided with guide stems 25' and 24' working in guide ways in the driving plates as shown in Fig. 4. At opposite sides of the hub are guard plates 28 which fit snugly but slidingly against the driving plates and are formed with central openings 29 for the hub, said plates being held in position by means of nuts 30 or their equivalent. The driving plates cover the inner ends or ears 5 of the tubular spokes 4 and are fastened thereto as indicated at 31, adding to the solidity and strength of the main body of the wheel. The guard plates 28 move with the floating hub and slide against the adjacent plates secured to the main body of the wheel and effectively exclude foreign matter. The universal movement keys while admitting of the full cushioning action of the springs, establish a driving connection between the hub and main body of the wheel adapting the wheel to be used either as a driving or steering wheel. The wheel as a whole may be used upon all kinds of vehicles such as automobiles, motor trucks, wagons, buggies and the like, saving wear and tear on the vehicle and its motor and doing away with the troublesome pneumatic tires now in common use.

What I claim is:—

A vehicle wheel embodying a felly, hub housing plates in spaced relation to each other, and tubular spokes having a fixed relation to said felly and housing plates, in combination with a floating hub movable between said housing plates in any direction in the vertical plane of the wheel, hub supporting and cushioning means in said spokes, and shoes interposed between said hub and cushioning means, and having a tongue and groove sliding arrangement with both of said housing plates.

In testimony whereof I affix my signature in presence of two witnesses.

JOHN A. RHONE.

Witnesses:
DAVID S. RICHMOND,
FLOYD H. LEMON.